(12) United States Patent
Casimir et al.

(10) Patent No.: US 8,669,733 B2
(45) Date of Patent: Mar. 11, 2014

(54) ENGINE POWER SUPPLY CIRCUIT, AND FLIGHT CONTROL MEMBER PROVIDED WITH SUCH A CIRCUIT

(75) Inventors: Roland Casimir, Paris (FR); Tony Fourmont, Paris (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 13/262,078

(22) PCT Filed: Mar. 30, 2010

(86) PCT No.: PCT/EP2010/054225
§ 371 (c)(1),
(2), (4) Date: Oct. 31, 2011

(87) PCT Pub. No.: WO2010/112514
PCT Pub. Date: Oct. 7, 2010

(65) Prior Publication Data
US 2012/0038302 A1    Feb. 16, 2012

(30) Foreign Application Priority Data

Apr. 3, 2009   (FR) ..................................... 09 01630

(51) Int. Cl.
*G05B 5/01*    (2006.01)

(52) U.S. Cl.
USPC ...... 318/611; 318/702; 318/800; 318/400.26; 318/375; 318/380; 363/37; 363/40; 363/41

(58) Field of Classification Search
USPC .......... 318/400.25, 400.01, 400.24, 375–381, 318/759–762, 800–812, 361, 91.1, 91.2, 318/91.3, 400.26; 363/37, 98, 131, 132
See application file for complete search history.

(56) References Cited

U.S. PATENT DOCUMENTS

| 6,058,031 A * | 5/2000 | Lyons et al. ..................... 363/67 |
| 2004/0160792 A1 * | 8/2004 | Youm et al. ..................... 363/37 |

FOREIGN PATENT DOCUMENTS

| DE | 10 2005 009376 A1 | 5/2006 |
| EP | 2 006 991 A | 12/2008 |
| GB | 2 427 968 A | 1/2007 |

* cited by examiner

*Primary Examiner* — Eduardo Colon Santana
*Assistant Examiner* — Bickey Dhakal
(74) *Attorney, Agent, or Firm* — Muncy, Geissler, Olds & Lowe, P.C.

(57) ABSTRACT

A power supply circuit for an electric motor, the circuit comprising a plurality of inverter bridge arms, each having means for connection to a respective winding of the motor, each inverter bridge arm comprising in series a first insulated gate bipolar transistor and a junction field effect transistor that are connected to a controller, the circuit including a second insulated gate bipolar transistor connected in series with each field effect transistor and connected to the controller, and a damping resistor connected in parallel with the second bipolar transistor. An aircraft flight control member including a movable airfoil associated with at least one drive motor connected to such a power supply circuit.

4 Claims, 1 Drawing Sheet

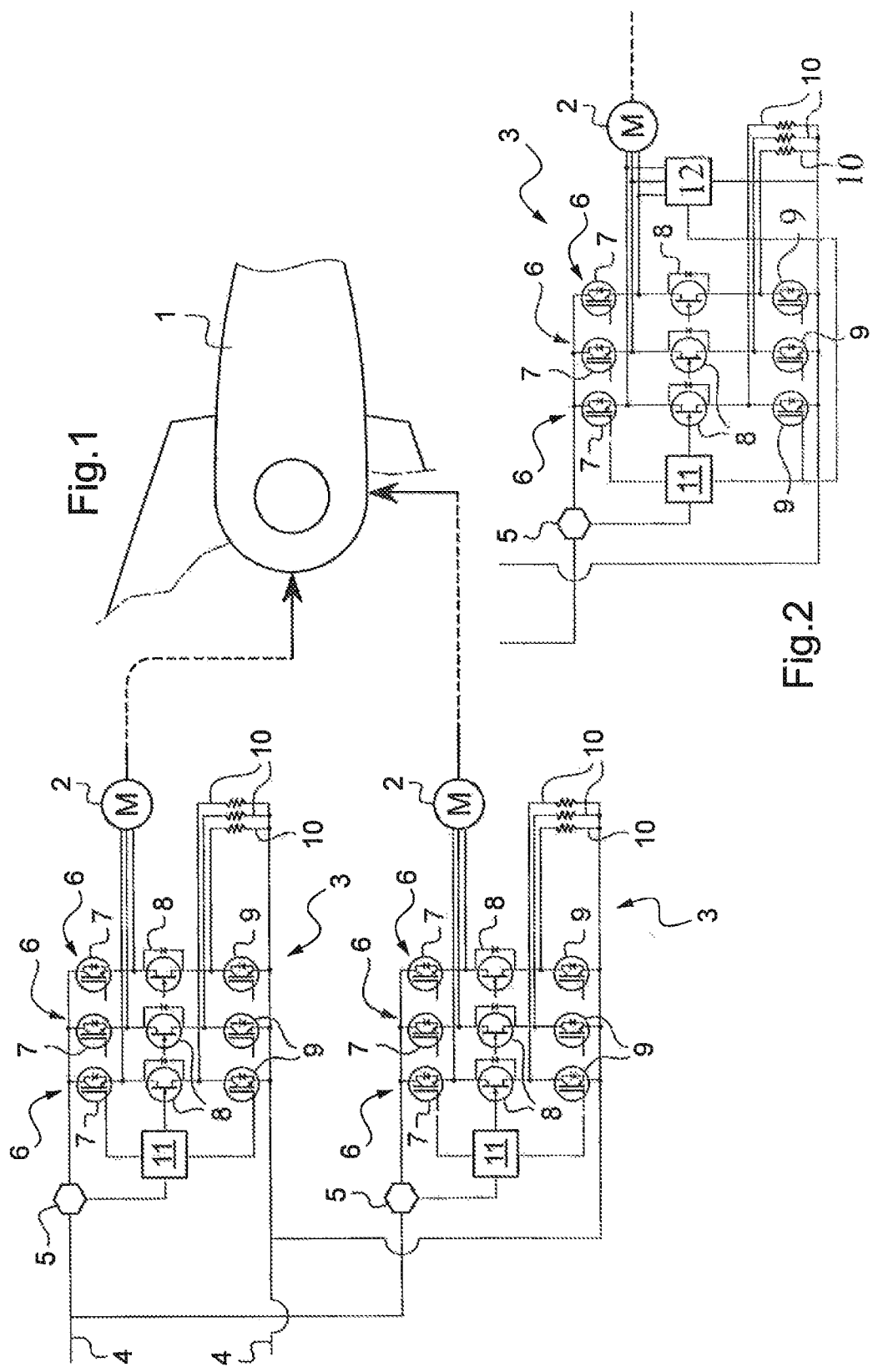

ENGINE POWER SUPPLY CIRCUIT, AND FLIGHT CONTROL MEMBER PROVIDED WITH SUCH A CIRCUIT

FIELD OF THE INVENTION

The present invention relates to a circuit for powering an electric motor, e.g. usable for actuating a movable airfoil of an aircraft. The invention also relates to a flight control member of an aircraft including such a movable airfoil.

BACKGROUND OF THE INVENTION

Present-day aircraft are making more and more use of electrical flight control systems. Such systems comprise flight control members including a movable airfoil, such as an aileron, a flap, or an elevon, associated with two electric motors, each connected to a power supply circuit controlled using control signals coming from flight controls operated by the pilot of the aircraft. The two motors are used in alternation such that in the event of one of the motors failing, the other motor can be used as a replacement.

Each power supply circuit comprises a plurality of inverter bridges each made up of three bridge arms, themselves provided with means for connecting each of them to a respective winding of the motor. Each inverter bridge arm comprises in series a first insulated gate bipolar transistor and a second insulated gate bipolar transistor that are connected to a controller, itself connected to the piloting instruments.

When one of the motors is not used, it is disconnected from the power supply circuit, but it is nevertheless expected to exert a force on the movable airfoil so as to damp its movement.

A dedicated damper circuit is thus provided between the motor and the power supply circuit for dissipating the energy it produces when it is driven by the movable airfoil under drive from the other motor or under a dynamic effect. Such a damper circuit is connected to the motor via an electromechanical relay that connects the motor selectively to the power supply circuit or to the damper circuit. Such a relay presents several drawbacks: a short lifetime, in particular because of switching under load, unreliable ability to withstand vibration, and weight and volume that are not very compatible with the requirements to save weight and space that are imposed by the design constraints on aircraft. A failure of the main member of the relay (coil or control) also leads to losing all of the capacity for damping.

OBJECT AND SUMMARY OF THE INVENTION

An object of the invention is to provide a damping solution that is simple, reliable, and lightweight.

To this end, the invention provides a circuit for powering an electric motor, the circuit comprising at least one inverter bridge made up of a plurality of bridge arms, themselves provided with means for connecting each of them to a respective winding of the motor, each bridge arm comprising in series a first insulated gate bipolar transistor and a junction field effect transistor, which transistors are connected to a controller, the circuit including a second insulated gate bipolar transistor connected in series with each junction field effect transistor and connected to the controller, and also a damping resistor connected in parallel with the second insulated gate bipolar transistor.

Thus, the power supply circuit possesses an active mode in which it powers the motor, and a passive mode in which it provides damping. In the active mode, the first bipolar transistors and the field effect transistors are controlled to power the windings of the motor in succession, while the second bipolar transistors are kept closed by the controller so as to short circuit the resistors. In the passive mode, the power supply circuit is disconnected from the electricity network: all of the bipolar transistors are naturally open since there is no energy available from the bridge and the junction field effect transistors remain naturally closed when not powered: the windings of the motor are thus connected to the damping resistors. Junction field effect transistors present reliability and lifetime that are better than those of a relay, and they present weight and volume that are smaller than those of a relay. In the event of one of the junction field effect transistors failing in the open state, only the resistor connected thereto is made unusable for damping, such that the impact of such a failure is limited: the overall damping of the motor is reduced, but not to zero. Controlling the second bipolar transistors also makes it possible to vary damping.

Preferably, the circuit includes input means for connection to a DC network and associated with a cutout arranged to isolate the power supply circuit from the network when power is being dissipated in the damping resistors.

The cutout serves in passive mode to prevent the diodes that are internal to the first bipolar transistors becoming active and to prevent residual surges being returned to the network when the damping resistors are not sufficient for absorbing all of the surges produced by the motor. The invention also provides an aircraft flight control member including a flight control surface associated with at least one drive motor that is connected to a power supply circuit of the above-specified type.

BRIEF DESCRIPTION OF THE DRAWINGS

Other characteristics and advantages of the invention appear on reading the following description of a particular, non-limiting embodiment of the invention.

Reference is made to the accompanying drawing, in which:

FIG. 1 is a diagram of a flight control member in accordance with the invention; and FIG. 2 is a fragmentary view, analogous to FIG. 1, showing a variant embodiment.

MORE DETAILED DESCRIPTION

With reference to the figure, the flight control member in accordance with the invention comprises a movable airfoil 1 such as an aileron, a flap, a rudder, or an elevon, mounted to move on the structure of an aircraft (wing, tail plane, tail fin).

The movable airfoil 1 is moved by means of two motors 2, each associated with a power supply circuit given overall reference 3. The power supply circuits 3 are connected to the direct current (DC) power-supply network 4 of the aircraft and they are connected in known manner to a control unit that is programmed to operate the aircraft and that can be actuated from the cockpit via flight controls operated by the pilot. The outlet shafts from the motors 2 may be connected to the hinge pin of the movable airfoil 1 in order to drive pivoting thereof, or they may be provided with a screw on which a nut is engaged that is secured to a lever that is in turn secured to the movable airfoil 1. If the movable airfoil 1 is mounted to slide, then each of the outlet shafts from the motors 2 may be provided with a screw having a nut engaged thereon that is secured to the movable airfoil 1 or that acts on two arms of a deformable parallelogram having the movable airfoil 1 secured thereto.

Each power supply circuit 3 includes an input line having a cutout 5 and an output line with three inverter bridge arms 6 connected mutually in parallel between them, the arms being provided with means for connecting each of them to a respective winding of the motor 2. Each inverter bridge arm 6 comprises a first insulated gate bipolar transistor (IGBT) 7 connected in series with a junction field effect transistor (JFET) 8. A winding of the motor is connected between each of these two transistors.

Each power supply circuit 3 has a second IGBT 9 connected in series with one of the JFETs 8 and a damping resistor 10, each of the damping resistors being connected in parallel with a respective one of the second IGBTs 9.

The transistors 7, 8, and 9, and the cutout 5 are connected to a controller 11, itself connected to the control unit.

Each power supply circuit 3 has an active mode in which it powers the corresponding motor 2 to move the movable airfoil 1, and a passive mode in which it damps the movement of the movable airfoil surface 1.

In the active mode, the first IGBTs 7 and the JFETs 8 are controlled to power the windings of the motor 2 in succession, while the second IGBTs 9 are kept closed by the controller 11 in order to short circuit the damping resistors 10.

In the passive mode, all of the IGBTs 7 and 9 are naturally open in the absence of any power supply, with the JFETs 8 naturally remaining closed in the absence of any power supply in order to connect the windings of the motor 2 to the damping resistors 10.

In the absence of voltage on the input line upstream from the cutout 5 (disconnection of the network 4), the controller 11 causes the cutout 5 to open so as to ensure that in the passive mode the diodes internal to the IGBTs 7 and 9 become active and any residual surges are returned to the network 4. Such a return could occur in the absence of the cutout 5 if the damping resistors are not sufficient to absorb all of the surges produced by the motor 2.

The control unit controls the controller 11 of each power supply circuit 3 to put one of the power supply circuits 3 in its active mode and the other power supply circuit 3 in its passive mode. Thus, the motor 2 connected to the power supply circuit 3 that is in its active mode serves to move the movable airfoil 1, while the motor 2 that is connected to the power supply circuit 3 that is in its passive mode serves to damp the movement of the movable airfoil 1. In this power supply circuit 3, the electrical energy produced by the motor 2 when it is itself driven by the movable airfoil 1 is exhausted and consumed in the damping resistors 10.

The controller 11 is capable of causing all or some of the second IGBTs 9 to open or close simultaneously or of causing them to open (or close) in succession.

Under certain circumstances, the control unit may control the controller 11 of each power supply circuit 3 so as to put both power supply circuits 3 into the passive mode so as to leave the movable airfoil 1 free to feather.

With the circuit of the invention, the second IGBTs may be underdimensioned in terms of voltage and overdimensioned in terms of current since they are operated in static manner.

In the variant of FIG. 2, an independent electronic circuit 12 is connected to the windings and is arranged in parallel with the JFETs 8 and the IGBTs 9.

The independent electronic circuit 12 is arranged to power the IGBTs 9 continuously or intermittently so as to increase damping. Under such circumstances, damping increases with an increase in the amount of energy returned by the motor (in the event of a gust moving the movable airfoil 1). The independent electronic circuit 12 operates when the motor produces enough energy to power it.

Naturally, the invention is not limited to the embodiment described but covers any variant coming within the scope of the definition of the invention that appears in the claims.

In particular, the cutout is optional if the resistors 10 are dimensioned to be appropriate for all utilization circumstances.

In addition, for safety reasons, it is possible to provide two independent electronic circuits.

What is claimed is:

1. A power supply circuit for an electric motor, the circuit comprising a plurality of inverter bridge arms, each having means for connection to a respective winding of the motor, wherein each inverter bridge arm comprises in series a first insulated gate bipolar transistor and a junction field effect transistor that are connected to a controller, and wherein the circuit includes a second insulated gate bipolar transistor connected in series with each field effect transistor and connected to the controller, and a damping resistor connected in parallel with the second bipolar transistor, the controller is arranged to put the power supply circuit in an active mode and a passive mode so that:

in the active mode, the first insulated gate bipolar transistor and the first junction field effect transistor are controlled to power the windings of the motor in succession, while the second first insulated gate bipolar transistor is kept closed by the controller in order to short circuit the damping resistor;

in the passive mode, all of said insulated gate bipolar transistors are naturally open in the absence of any power supply, with the first junction field effect transistor naturally remaining closed in the absence of any power supply in order to connect the windings of the motor to the damping resistor.

2. A circuit according to claim 1, including input means for connection to a DC network and associated with a cutout arranged to isolate the power supply circuit from the network when power is being dissipated in the damping resistors.

3. A circuit according to claim 1, including at least one independent electronic circuit connected to the windings in parallel with the second bipolar transistors and the field effect transistors, said at least one independent electronic circuit being arranged to control the second bipolar transistors continuously or intermittently, thereby increasing damping.

4. An aircraft flight control member including a movable airfoil associated with at least one drive motor connected to the power supply circuit according to claim 1.

* * * * *